United States Patent
Etgen et al.

(10) Patent No.: US 8,560,242 B2
(45) Date of Patent: Oct. 15, 2013

(54) PSEUDO-ANALYTICAL METHOD FOR THE SOLUTION OF WAVE EQUATIONS

(71) Applicant: BP Corporation North America Inc., Houston, TX (US)

(72) Inventors: John T. Etgen, Houston, TX (US); Sverre Brandsberg-Dahl, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 0 days.

(21) Appl. No.: 13/622,186

(22) Filed: Sep. 18, 2012

(65) Prior Publication Data

US 2013/0018640 A1    Jan. 17, 2013

Related U.S. Application Data

(62) Division of application No. 12/574,529, filed on Oct. 6, 2009, now Pat. No. 8,296,069.

(60) Provisional application No. 61/103,143, filed on Oct. 6, 2008.

(51) Int. Cl.
G06F 17/13    (2006.01)

(52) U.S. Cl.
USPC ............................................................. 702/16

(58) Field of Classification Search
USPC ............................................................. 702/16
See application file for complete search history.

(56) References Cited

PUBLICATIONS

Michael C. Fehler and Lianjie Huang, Modern Imaging Using Seismic Reflection Data, Annu. Rev. Earth Planet. Sci. 2002. 30:259-84, 30 pages.*
Novel Use of P- and S-wave Seismic Attenuation for Deep Natural Gas Exploration and Development, Oct. 1, 2004 to Sep. 30, 2006, 207 pages.*

* cited by examiner

*Primary Examiner* — Tung S Lau
(74) *Attorney, Agent, or Firm* — Gunnar Heinisch

(57) ABSTRACT

The instant invention is a method for numerically propagating waves or solving wave equations on a digital computer. This invention can be used to compute highly accurate solutions to the wave equation, in fact in some cases it computes the analytical solution, something previously considered impossible. The instant method can also propagate waves that are not described by differential equations, such as anisotropic scalar waves. The invention has the advantages that it is computationally efficient, accurate, and flexible. Of importance is the ability to propagate waves that simulate the P-wave arrivals in both isotropic and anisotropic media with a scalar as opposed to a vector equation.

7 Claims, 3 Drawing Sheets

PSEUDO-ANALYTICAL METHOD FOR THE SOLUTION OF WAVE EQUATIONS

CROSS REFERENCE TO RELATED CASES

The present application is a divisional application of U.S. application Ser. No. 12/574,529, filed Oct. 6, 2009, which claims the benefit of U.S. Provisional Application Ser. No. 61/103,143, filed Oct. 6, 2008, and are herein incorporated in their entireties for all purposes.

TECHNICAL FIELD

This invention relates to the general subject matter of geophysical subsurface imaging and more particularly to subsurface imaging using wavefield extrapolations via numerical solution of the wave equation.

BACKGROUND OF THE INVENTION

A seismic survey represents an attempt to image or map the subsurface of the earth by sending energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey.

A conventional seismic survey is composed of a very large number of individual seismic recordings or traces. In a typical 2-D survey, there will usually be several tens of thousands of traces, whereas in a 3-D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. The seismic energy may also take more varied paths from source to receiver, for example reflecting or scattering multiple times off inhomogeneities, reflecting from the surface of the earth or the bottom of the ocean one or more times, or bending through gradual velocity gradients without reflecting.

Many variations of the conventional source-receiver arrangement are used in practice, e.g. VSP (vertical seismic profile) surveys, ocean bottom surveys, etc. Further, the surface location of every trace in a seismic survey is carefully tracked and is generally made a part of the trace itself (as part of the trace-header information). This allows the seismic information contained within the traces to be later correlated with specific surface and subsurface locations, thereby providing a means for posting and contouring seismic data—and attributes extracted therefrom—on a map (i.e., "mapping").

Many algorithms exist for transforming the recorded seismic information into a geologically interpretable image. Since seismic data is typically observed (recorded) only at the surface of the earth, whereas the desired image is ideally a volume encompassing all of the interior of the earth that was illuminated by the seismic energy, central to all of these methods is a wavefield-extrapolation engine that computationally simulates the seismic waves propagating inside the earth from source to receiver. As is well known to those of ordinary skill in the art, the transmission, reflection, diffraction, etc., of seismic waves within the earth can be modeled with considerable accuracy by the wave equation, and accordingly wave-equation-based wavefield-extrapolation engines are the method of choice for difficult imaging problems. The wave equation is a partial differential equation that can readily be couched in terms of one, two, or three dimensions. For complex imaging challenges, the constant-density acoustic wave equation extrapolating in time is typically used as the extrapolation engine. Coupled with an imaging condition it yields an image of reflectors inside the earth. Imaging in this way is called "reverse-time migration". The same extrapolation engine can also be used within an iterative optimization process that attempts to find an earth model that explains all of the seismic information recorded at the receivers. This is called "full-waveform inversion". Ideally, inversion produces a 3-dimensional volume giving an estimated subsurface wave velocity at each illuminated point within the earth. If the acoustic wave equation is used, which incorporates both velocity and density as medium parameters, inversion may produce a 3-dimensional volume giving both the velocity and density at each point.

If the velocity is not only a function of location inside the earth, but also a function of the direction the waves propagate through a location, an anisotropic wave equation is required to perform the extrapolations for either migration or inversion. Currently, propagating waves anisotropically requires using the much more expensive (often prohibitively expensive) elastic wave equation in the extrapolation engine.

Of course, numerical solutions of the wave equation pose considerable theoretical and practical problems, especially when the computation is performed in three dimensions ("3D"). One particularly vexing problem is that conventional methods of solving the wave equation—except in very simple/unrealistic subsurface configurations—are not exact so that errors and distortions are generally introduced into the calculated results. In practice higher accuracy could only be achieved by using a finer computational mesh, which is often prohibitively expensive.

As is well known in the geophysical prospecting and interpretation arts, there has been a need for a method of extrapolating waves in time using the wave equation that remains accurate without requiring a fine computational mesh, and which can handle anisotropy without requiring an elastic wave equation. Accordingly, it should now be recognized, as was recognized by the present inventors, that there exists, and has existed for some time, a very real need for a method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a first preferred embodiment, there is provided a method of seismic processing that utilizes a pseudo-differential space-domain operator in connection with a (preferably) second-order time-marching finite-difference method to solve the 1, 2, or 3-dimensional, etc., constant-velocity constant-density acoustic wave equation to near analytical accuracy. For the acoustic wave equation, this operator is similar to the Laplacian operator. In the preferred embodiment, a modified Laplacian gives better accuracy than the Laplacian itself. In a variable velocity scenario, these operators will preferably be interpolated to give a pseudo-analytical solution. Since the underlying pseudo-differential operators are regular (smooth and easily interpolated), a high accuracy can be achieved at low cost.

It should be noted that the instant approach can propagate waves for a broad class of differential and pseudo-differential equations beyond the acoustic wave equation. Of practical interest, the instant method can implement a scalar anisotropic wave equation. This general approach also leads to a technique for creating optimal spatial finite-difference operators for equations that are more conveniently implemented purely in the space domain.

The instant invention provides a general-purpose engine that is suitable for use with a number of different seismic processes such as reverse-time or other migration, full-waveform inversion, seismic modeling, etc. A preferred use, though, is in connection with 3D pre-stack reverse-time imaging and full-waveform inversion. In brief, the instant invention provides a general-purpose computational engine that can replace the existing time extrapolators within a variety of different algorithms to improve their performance and accuracy, and allow them to be generalized to handle scalar anisotropy.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

While the inventive system and methods have been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

General Environment of the Invention

Figure 1:
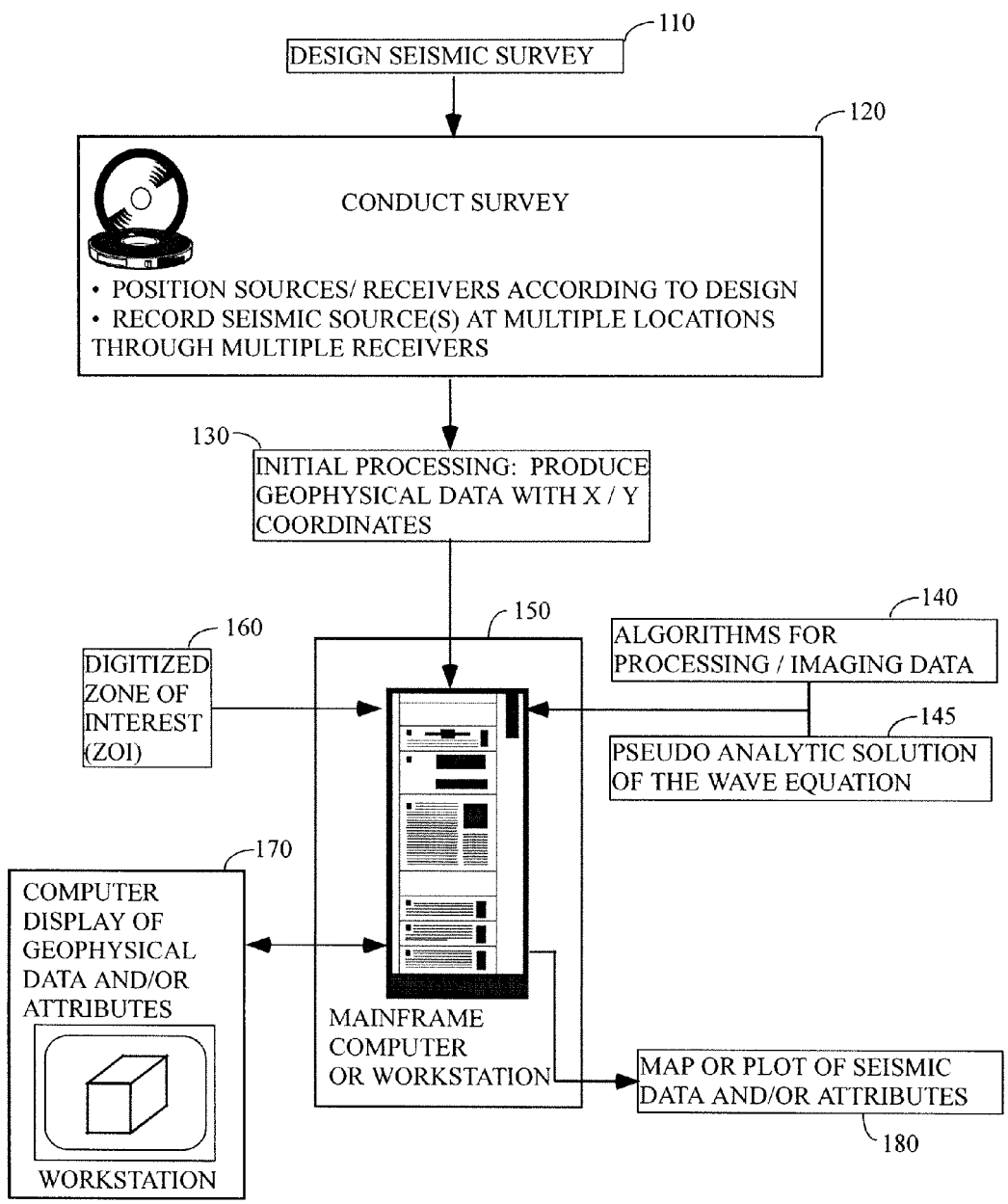
FIG. 1 illustrates the general environment of the instant invention

FIG. 1 illustrates the general environment in which the instant invention would typically be used. As a first step, a seismic survey will be designed (step 110), wherein the survey geometry, sample rate, number of sources/receivers, etc. would typically be selected in order to image a preferred subsurface target. Among the many parameters that might be considered in formulating the survey design are:

- the surface area to be covered by the survey;
- whether the survey will be conducted on land, offshore, or some combination of the two environments;
- the depth of the target;
- the 3D structure of the target (including its 2D or 3D dip, if any);
- whether the design will utilize an "end on" configuration (wherein all of the active receivers are on the same side of the source) a "split spread" configuration (i.e., wherein active receivers are placed both ahead of and behind of the source), a "multi-azimuth" configuration (i.e., with active receivers along several fixed azimuths around the source), or a "wide-azimuth" configuration (i.e. with active receivers entirely surrounding the source), etc.;
- the maximum offset (i.e., in the case where an active source is used, the distance from the source to the most distant active receiver) and minimum offset (i.e., the distance from the source to the closest active receiver);
- the receiver-to-receiver spacing;
- the source-point spacing if a controlled source is used (i.e., the shot-to-shot spacing, where "shot" is used in the sense of "source activation point");
- the relation between source-points and receiver-points (e.g., sources near to receivers, sources midway between receivers, etc.);
- the frequencies expected in the received data;
- the strength of the sources, and the sensitivity of the receivers, etc.

Of course, the selection of parameters such as the foregoing are design choices that are well within capability of one of ordinary skill in the art. Further, those of ordinary skill in the art will recognize that many of the previous parameters are interrelated (e.g., specification of the target depth determines in a general way a preferred maximum offset, etc.).

Next, equipment (including geophones and/or hydrophones or other seismic receivers, as well as recording instruments, etc.) will be typically moved to and set up in the field at least approximately according to the planned survey design 110. Next, a survey will be conducted 120 that is preferably at least approximately in accordance with the original design. Of course, it is certainly possible that on-site changes will need to be made to the survey as-designed. However, generally speaking the goal of the field crew is to replicate the parameters of the original survey parameter specifications as closely as is possible.

Additionally, it should be noted that preferably the receivers will be divided between surface receivers (which may be, for example, on or near the earth's surface, towed beneath the ocean surface, or on the bottom of the ocean) and one or more downhole receivers. Methods for emplacing either temporarily or permanently sea bottom and downhole receivers are well known to those of ordinary skill in the art and will not be discussed further here.

After positioning the source and receivers, the data will preferably be collected conventionally depending on the sort of survey that is being taken. For example, if an active survey is conducted each source activation might be accompanied by 8 seconds or so of recording at a 2 ms sample interval, with the exact length of each recording and sample rate being depending on a number of factors well known to those of ordinary skill in the art. On the other hand, if the survey is a passive one, the recording will preferably be continuous or nearly so, with the data possibly broken up into convenient individual records, the length of which typically may be 30 s or more.

As is typical in controlled-source seismic surveys, the source (or sources) will be activated and the resulting seismic signals sensed by the receivers and converted to electrical energy which is subsequently digitized and recorded. The response of each receiver to the source will preferably be captured digitally as a function of time and stored on magnetic or other media for transportation to a centralized computing facility where the data will be processed, interpreted, and integrated into other data taken over the same prospect. That being said, in some instances some amount of initial processing 130 will be applied to the data while it is in the field. For example, such in-field processing might be done in order to verify the quality of the data that are being collected. In other instances, the data might be processed to see whether or not the target subsurface rock units are being imaged adequately. In any case, after field processing the data will usually at least be relatable to specific locations on the surface of the earth.

Although the data that are collected according to the instant invention may be processed to some extent in the field (step 130), eventually the recorded seismic data will typically be transferred to a processing center where more computing resources 150 and algorithms 140 are available. The methods of the instant invention (e.g., computer algorithm 145) will preferably be implemented in a processing center or other facility suitable for processing seismic data. In the processing center a variety of processes 140 might be applied to the data to make them ready for use by the explorationist. At some point the processed data traces will likely be stored, by way of example only, on hard disk, magnetic tape, magneto-optical disk, DVD disk, or other mass storage means.

The methods disclosed herein would best be implemented in the form of a computer program 140 that has been loaded onto a programmable computer 150 where it is accessible by a seismic interpreter or processor. Note that a computer 150 suitable for use with the instant invention would typically include, in addition to mainframes, servers, and workstations, super computers and, more generally, a computer or network of computers that provide for parallel and massively parallel computations, wherein the computational load is distributed between two or more processors. As is also illustrated in FIG. 1, in the preferred arrangement some sort of digitized zone of interest model 160 may be specified by the user and provided as input to the processing computer program. In the case of a 3D seismic section, the zone of interest model 160 would typically include specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those skilled in the art will recognize that this might be done any number of ways.

The algorithms that are used to process the seismic data might be conveyed into the computer 150 by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network.

After the seismic data have been subjected to the processes discussed herein, the resulting information will likely be displayed either on a high-resolution color computer monitor 170 or in hard-copy form as a printed section or a map 180. The geophysical interpreter would then use the displayed images to assist him or her in identifying subsurface features conducive to the generation, migration, or accumulation of hydrocarbons.

Figure 2:
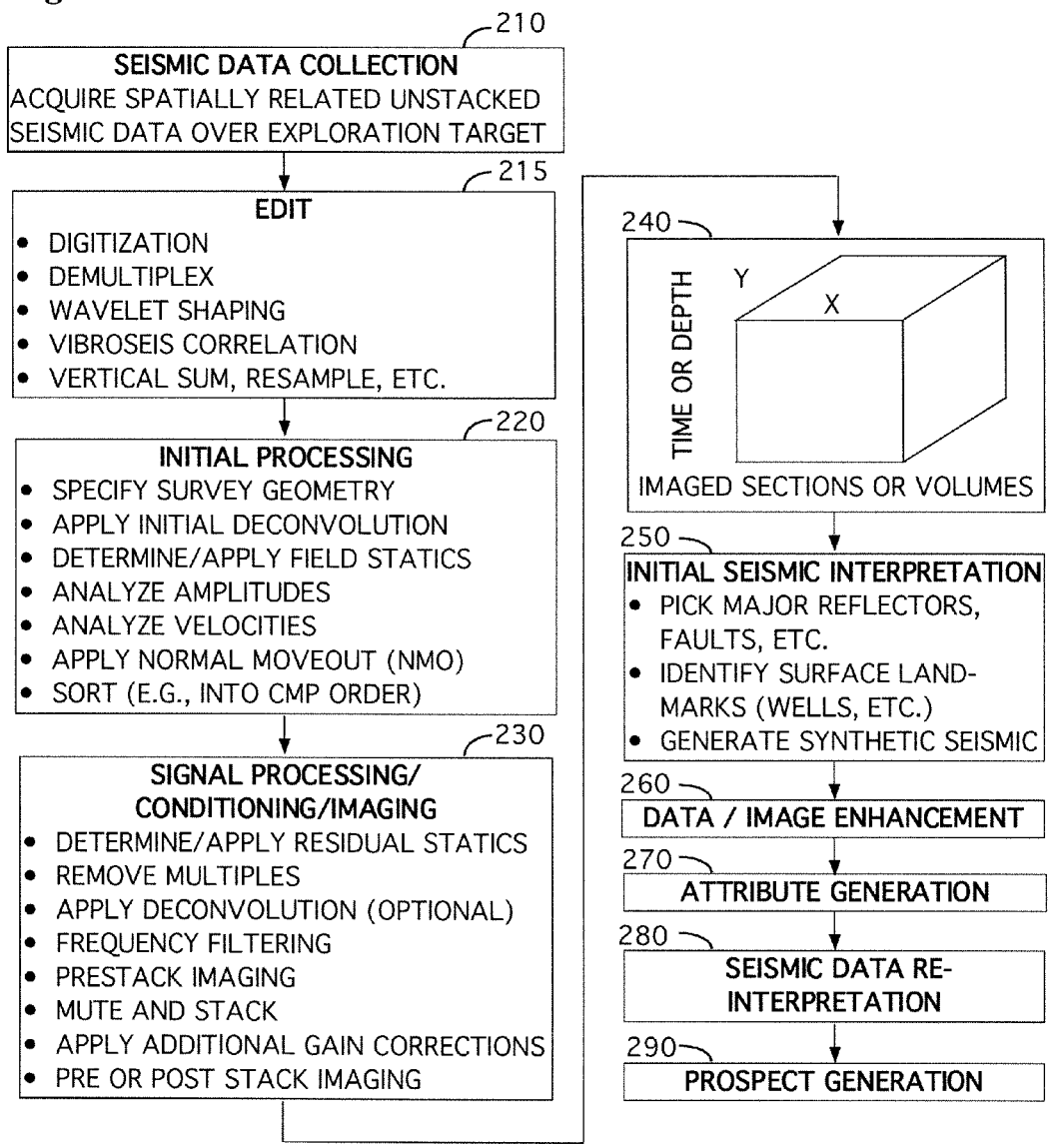
FIG. 2 illustrates a typical seismic processing sequence.

Turning next to FIG. 2, after the seismic data are acquired (step 210) they are typically taken to a processing center where some initial or preparatory processing steps are applied to them. A common early step 215 is designed to edit the input seismic data in preparation for subsequent processing (e.g., demux, gain recovery, wavelet shaping, bad trace removal, etc.). This might be followed by specification of the geometry of the survey (step 220) and storing of a shot/receiver number and a surface location as part of each seismic trace header. Once the geometry has been specified, in some cases a velocity analysis will be performed and an NMO (normal move out) correction may be applied to correct each trace in time to account for signal arrival time delays caused by offset. However, other techniques (such as pre-stack migration) might be used instead.

After the initial processing is completed, it is customary to condition the seismic signal further, followed by migration or inversion, typically followed by some post-imaging cleanup of the resulting image/attribute surface(s)/volume(s) (step 230). In FIG. 2 step 230 contains a typical "Signal Processing/Conditioning/Imaging/Post-processing" sequence, but those skilled in the art will recognize that many alternative processes could be used in place of the ones listed in the figure. In any case, the ultimate goal from the standpoint of the explorationist is the production of an image/attribute volume(s)/surface(s), for use in the exploration for hydrocarbons within the subsurface of the earth.

As is further suggested in FIG. 2, any digital sample within a seismic volume is uniquely identified by a (X, Y, Z) triplet, with the X and Y coordinates representing some position on the surface of the earth, and the Z coordinate measuring depth below a horizontal datum plane (step 240). Although depth is a preferred and most common vertical axis unit, those skilled in the art understand that other units are certainly possible and might include, for example, time or frequency. Additionally, it is well known to those skilled in the art that it is possible to convert seismic traces from one axis unit (e.g., depth) to another (e.g., time) using standard mathematical conversion techniques.

Typically multiple surfaces or volumes will be produced during processing, the surfaces or volumes differing for example in the source-receiver offset or azimuth used to produce them. In other instances, volumes may be produced from some combination of source or receiver gathers. Since these surfaces or volumes are each meant to represent different views of the same subsurface region of the Earth, the explorationist may do an initial interpretation 250 of the resulting surfaces or volumes, wherein he or she determines whether they are consistent with each other. If the results are not consistent, the explorationist may conclude that the subsurface model that was used to create these views of the subsurface needs to be adjusted; the information in the surfaces or volumes can then be used to improve the subsurface model.

Once the results are sufficiently consistent, the explorationist will next locate and identify the principal reflectors, faults, and/or geological formations wherever they occur in the surfaces or volumes, and generate synthetic seismograms to verify that the interpretation is consistent with available surface and/or subsurface information, for example from well logs 250. If the results are not consistent with known data or are not geologically sensible, this indicates that the subsurface model is still in error and further iterations to improve it are required. This may result in an iterative process where a series of models are generated that are intended to converge toward a correct subsurface interpretation. Although modeling is often used in connection with this step 250, those of ordinary skill in the art will recognize that modeling might actually be used at any point in the processing sequence (including, for example, pre-survey to test acquisition parameters). It should be noted that the instant invention also provides a method of calculating synthetic seismograms based on the wave equation suitable for use at this step. Additionally, those of ordinary skill in the art will recognize that the instant method can equally well be applied as the wavefield extrapolation engine for performing reverse time (or other) migration or pre- or post stack imaging of the sort mentioned in connection with step 230.

The interpretation step 250 might be followed by additional data enhancement 260 of the stacked or unstacked seismic data and/or attribute generation (step 270) therefrom. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Technical Background

By way of general background, it is well known to those of ordinary skill in the art that wave equations can often be solved by finite-difference methods. The standard second-order acoustic wave equation in 1, 2, or 3 space dimensions and one time dimension is often discretized and solved using an explicit finite-difference method. The second-order difference method is conditionally stable subject to a CFL (i.e., Courant, Friedrichs, and Levy) condition on the time step. Accuracy is controlled by the grid spacing in space and time as compared with the wavelengths to be represented. Usually, substantial oversampling (say 10 points per wavelength) is required on the space axes. Thus, this approach can lead to high memory use and high computational cost if high accuracy is desired.

The difficulties that are encountered with low-order finite-difference methods have led to the design of high-order finite-difference methods, where here, "high-order" refers to high-order accurate space derivatives (e.g., using a Taylor-series approach to find the coefficients). The computational convenience of a second-order time-marching method is usually desired (although not always strictly required). High (spatial) order accurate methods use more than just the neighboring grid points to estimate the required spatial derivatives, which, of course, leads to increased computational cost. However, the benefit of being able to discretize the solution more coarsely (down to as few as 3 grid points per wavelength or less, which approaches the Nyquist limit of 2 grid points per wavelength) generally leads to a more accurate solution, for roughly the same accuracy at less cost and, certainly, drastically less memory usage (since memory usage grows with the cube of desired accuracy in a second-order scheme).

Others have applied optimization to the design of spatial-difference operators, and this approach is the current "gold-standard" method for high-order difference methods applied to wave equations. This approach (and other methods of this class) suffers one shortcoming in particular. The design process of the spatial difference coefficients assumes that infinitesimally small time steps are taken, which in practice is not true, and for cost reasons certainly not desirable. Presumably this was done to avoid having to optimize both the time and space accuracy jointly, a more complex non-linear optimization problem. This is unfortunate because in most cases (certainly for all second-order-accurate time-marching methods) the "sense" of the error caused by the time differencing is opposite to that caused by most common implementations of the space differencing. This "opposite sense" of the time and space errors is best seen with the second-order finite-difference scheme for the 1-space-dimension acoustic wave equation for constant velocity, where the second-order finite-difference scheme, in fact, generates the exact solution if the time-step size is chosen at the CFL stability limit, such that v*dt/dx=1.0. Unfortunately, this "trick" is not available with finite-difference methods in space dimensions higher than one and with any other medium than a constant velocity.

In practice, when deriving an optimal finite-difference scheme, it would be better to trade off or balance the two sources of error, the time- and space-differencing "inaccuracy", using a time-step size chosen to optimally balance the spatial errors of the finite-difference scheme. These are "good" finite-difference schemes that, of course, do not give an analytical result even in constant velocity media.

A common alternative scheme to the finite-difference method (particularly the high-space-order finite-difference method) is a technique called the pseudo-spectral method. This method uses the fact that the derivative of a function in the space domain can be represented by multiplication by "ik" in the Fourier wavenumber (spatial frequency) domain. A practical algorithm can be achieved through the use of the Fast Fourier Transform. At each time step, the current wavefield in the (x,y,z) space domain is transformed to the (kx,ky,kz) spatial frequency domain and multiplied by "ik" (or in the case of a second spatial derivative by $-|\vec{k}|^2$) and then inverse Fourier transformed back to the space domain.

Back in the space domain, the field can then be multiplied by spatially variable coefficients (e.g., velocity squared for the acoustic case) and combined with the wavefields from the current and previous time levels to create the wavefield at a new time level delta-t ($\Delta t$) ahead of the current time level. This method is well known and a description of same may be found in numerous prior art references.

This method is in principle more accurate than the high-order finite-difference method since the space derivatives are perfectly accurate for all non-aliased wavenumbers. However, the resulting time-marching method is not perfect since the time discretization is only second-order accurate, and thus introduces errors. Others have suggested a method that has "spectral" accuracy in time that uses an orthonormal polynomial expansion of the solution in time. This method is highly accurate, but quite cumbersome to implement, and it is rarely used. In particular, it does not use a simple second-order time-marching scheme, which requires keeping only one previous time level at each step in the extrapolation, which is desirable in practical modeling and data-processing applications such as reverse-time migration.

Preferred Embodiments

Turning now to a detailed discussion of the instant invention, the observation that is central to the operation of the instant invention is the recognition that time and space errors can be designed to cancel each other out. This suggests a useful application to the pseudo-spectral method. The instant inventors prefer the simplicity of the second-order-accurate time-difference scheme to more complex methods, since this approach leads to a computationally simple algorithm. The algorithm is thus designed to exactly (or nearly so) compensate the error of the second-order time differencing with a modified spatial-derivative operator expressed directly in the wavenumber domain. This approach uses not $-|\vec{k}|^2$ as a prior-art pseudo-spectral method would, but a modified function similar to $-|\vec{k}|^2$; one that is designed to "cooperate" with the second-order time-marching scheme to give a scheme that has no (or virtually no) error.

The discussion that follows will help illustrate this approach. As a starting point, consider the following expression for the finite-difference solution to the wave equation in one space dimension and time:

$$\frac{u(x, t+1) - 2u(x, t) + u(x, t-1)}{\Delta t^2} = \frac{v(x)^2}{\Delta x^2} u(x+1, t) - 2u(x, t) + u(x-1, t)$$

Solving for $u(x, t+1)$ gives a relatively simple expression which forms the basis for most time-domain finite-difference modeling schemes:

$$u(x, t+1) =$$
$$\frac{v(x)^2 \Delta t^2}{\Delta x^2}(u(x+1, t) - 2u(x, t) + u(x-1, t)) + 2u(x, t) - u(x, t-1).$$

If the previous finite-difference wave equation solution is transformed via the Fourier Transform, an expression in terms of wavenumber and frequency is obtained. This equation can then be reorganized to yield an expression for w (omega) as a function of the other variables (dx, v, k, dt, etc.):

$$(2\cos(\omega \Delta t) - 2) u(\omega, kx) = \frac{(v\Delta t)^2}{\Delta x^2}(2\cos(kx\Delta x) - 2) u(\omega, kx).$$

Solving for omega yields:

$$\omega = \frac{\cos^{-1}\left(\frac{(v\Delta t)^2}{2\Delta x^2}(2\cos(kx\Delta x) - 2) + 1\right)}{\Delta t}.$$

The phase velocity can then be obtained by dividing $\omega$ by the magnitude of the spatial wavenumber vector:

$$v_{phase} = \omega/|\vec{k}|.$$

Typically $v_{phase}$ for any numerical method is not a constant V, but an approximation to it that depends on k. Depending on the choice of dx, dt, and the spatial difference operator, the foregoing might be a pretty good approximation, or maybe not, but none of these methods is exactly correct for all k.

Instead, and according to a preferred embodiment of the instant invention, the expression for phase velocity can be written with the spatial-difference operator left unspecified as $F(\vec{k})$:

$$(2\cos(\omega \Delta t) - 2) u(\omega, \vec{k}) = \Delta t^2 v^2 F(\vec{k}) u(\omega, \vec{k})$$

$$\omega = \frac{\cos^{-1}\left(\frac{1}{2} v^2 \Delta t^2 F(\vec{k}) + 1\right)}{\Delta t}$$

Now, if we set $v_{phase}$ equal to the desired constant velocity V, the previous expression can be solved to find the spatial operator $F(\vec{k})$ that produces that desired result:

$$v_{phase} = \text{constant} = v$$

$$v = \frac{\cos^{-1}\left(\frac{1}{2} v^2 \Delta t^2 F(\vec{k}) + 1\right)}{\Delta t |\vec{k}|},$$

with, $$F(\vec{k}) = \frac{2\cos(v\Delta t^2 |\vec{k}| + 1) - 2}{v^2 \Delta t^2}.$$

$F(\vec{k})$ is then the "error-compensating pseudo-differential operator" that, if used in a second-order time-marching method with the given dt, v, and dx, would lead to an error-free solution.

Note that if dt is small (say, very small, as compared to v/dx) then $F(\vec{k})$ is nearly equal to $-|\vec{k}|^2$. However, as dt becomes larger, say comparable to v/dx, $F(\vec{k})$ is somewhat different from $-|\vec{k}|^2$. It is a pseudo-differential operator $F(\vec{k})$ that, when combined with the second-order time-difference extrapolation in time, provides an exact solution. This combination produces the exact, or "analytical" solution used by the instant invention.

Note that the disclosure presented above has described a method that uses a second-order time-marching scheme to produce an exact solution to the constant velocity, arbitrary dimension (e.g., 1D, 2D, etc.), wave equation. This is an accomplishment that has been deemed heretofore to be impossible.

However, the constant-velocity case may not be best when the instant method is used in conjunction with most actual exploration plays. Subsurface hydrocarbon targets of interest tend to be located within rock units that vary in velocity (sometimes substantially) as a function of depth and/or laterally. Of course, using a method that is based on a constant-velocity assumption can lead to inaccurate results and incorrect interpretations of the configuration of rock units in the subsurface. Since $F(\vec{k})$ depends on the velocity, calculating the necessary spatial operators for a range of velocities would formally require a separate Inverse Fourier Transformation for each different velocity. Fortunately, though, $F(\vec{k})$ is a slowly varying function of the parameters v, dt, and dx. Typically, dt and dx will be constant for a given extrapolation step and $F(\vec{k})$ is also nearly a linear function of $v^2$. That observation suggests that variable-velocity extrapolation may be achieved by calculating two (or if higher accuracy is required, three or more) basis $F(\vec{k})$ and interpolating between them. The interpolation may be performed in the space domain so that only two (or three) Inverse Fourier Transforms are required.

So, a preferred embodiment of a variable-velocity algorithm would be to evaluate the constant-velocity $F(\vec{k})$ at a number of different velocities (usually two different velocities, with three or more velocities being preferred if extremely high accuracy is required) and combine the resulting wavefields according to a weighted sum by linearly (or quadratically, in the case of three basis values) interpolating between them over some function of v, preferably $v^2$. For example, let Fmin(•) and Fmax(•) be values of F(•) evaluated at vmin and vmax, respectively, where vmin is the minimum velocity at this extrapolation step and vmax is the maximum velocity at this extrapolation step.

Allocate memory Read parameters (Max time, grid spacings, etc)
Read velocity model V(x,y,z)
Compute time step size
Precompute F(kx,ky,kz,v,dt) for v=vmin call that Fmin(kx, ky,kz)
Precompute F(kx,ky,kz,v,dt) for v=vmax call that Fmax(kx, ky,kz)
Comment:
Compute interpolation weights for each point (x,y,z) (for example: linear interpolation weights) based on the local velocity v(x,y,z); weight for Fmin will be Cmin, Weight for Fmax will be Cmax (for example, linearly interpolated in v^2: Cmin=(v^2(x,y,z)−vmax^2)/(vmin^2−vmax^2), Cmax=(v^2 (x,y,z)−vmin^2)/(vmax^2−vmin^2).
Loop Over Time Steps
  Apply 3DFFT to wave(it,x,y,z) to obtain Wave(it,kx,ky,kz)
  compute reference wavefields in wavenumber domain:
  wavemin(kx,ky,kz)=Fmin(kx,ky,kz)*Wave(kx,ky,kz)
  wavemax(kx,ky,kz)=Fmax(kx,ky,kz)*Wave(kx,ky,kz)
  Inverse 3D FT the reference wavefields back to the space domain to obtain wavemin(x,y,z), wavemax(x,y,z).
  Compute the appropriately pseudo-differentiated wavefield at each point by weighting the reference wavefields in the space Domain using the interpolation weights
  pLwave(x,y,z)=Cmin(x,y,z)*wavemin(x,y,z)+Cmax(x, y,z)*wavemax(x,y,z)
  wave (it+1,x,y,z)=pLwave(x,y,z)+2*wave(it,x,y,z)−wave (it−1,x,y,z)+source_term(it)
  write desired wavefield values to storage
End Loop on Time Steps Those of ordinary skill in the art will readily understand that the previous algorithm could be used to interpolate over any suitable function of any suitable medium parameters using two or more basis functions.

The instant method will be called a "pseudo-analytical method" herein, since it interpolates reference analytical solutions to achieve a very high degree of accuracy, a degree of accuracy that is better than can be achieved by any other time marching method that is known currently.

Figure 3:
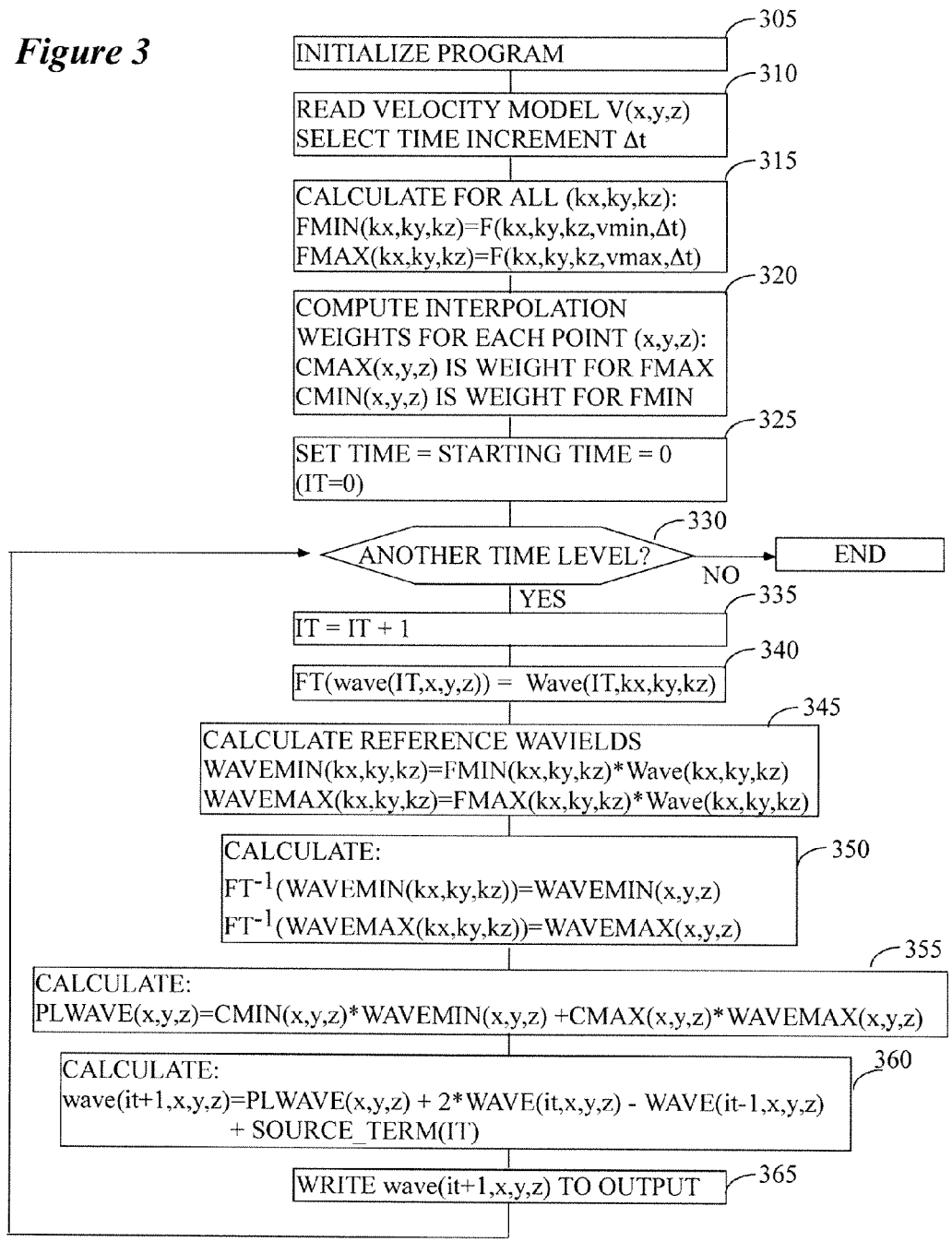
FIG. 3 illustrates a preferred operating logic suitable for use with the instant invention.

Turning next to FIG. 3 wherein there is a preferred operating logic, as an initial step 305 the instant method will preferably activate and initialize a computer program that has been developed to implement it. The initialization might include, for example, allocating memory, reading parameters such as starting and ending times, grid spacings, a subsurface velocity model which will preferably be of the form V(x,y,z). Additionally, in connection with this step the seismic data may be sorted into shot gathers, receiver gathers, constant offset/azimuth gathers, etc, depending on the wavefield being extrapolated, as required to make the calculations more efficient. That being said, the traces will preferably organized into shot gathers. Of course, those of ordinary skill in the art will recognize that when seismic data are sorted, the traces do not have to be physically moved on the storage device, but instead, trace pointers can often be manipulated to achieve this same result.

As a next preferred step 310, the velocity model V(x,y,z) will be accessed by reading all of part of it from storage. Preferably, this will be a 3D model as is indicated in the previous sentence, but it could also be a 2D or 1D model, including models that consist of a single (constant) velocity. The creation, storage, and reading of such velocity models is well known in the art. Additionally, a time increment ΔT will preferably be selected. In some preferred embodiments, the timing increment will be the sample rate of the data (e.g., 2 ms, 4 ms, etc.). When the time increment is the same as the sample rate, the variable ΔT might be an integer such as 1, 2, etc. which counts samples rather than milliseconds.

As a next preferred step 315, the error compensating pseudo-differential operator will be calculated for two, three, or more different constant velocities or constant medium parameters according to the equations presented previously. For the simplest case of the constant-density acoustic wave equation, preferably, the calculation will be made for two different velocities at each extrapolation step: the minimum velocity and the maximum velocity of the model domain to be extrapolated.

As a next preferred step 320, the interpolation weights will be calculated for each point in the accessed portion of the survey. For the constant-velocity acoustic case the interpolation coefficients will be linearly interpolated in $v^2$ between $vmin^2$ and $vmax^2$. For example, the following weights could be used:

$$Cmin = \frac{v(x, y, z)^2 - vmax^2}{vmin^2 - vmax^2}$$

$$Cmax = \frac{v(x, y, z)^2 - vmin^2}{vmax^2 - vmin^2}$$

For higher accuracy, or in the case of a wave equation requiring more than one medium parameter per grid point, more reference operators and/or higher-order interpolation may be used according to methods well known to those of ordinary skill in the art.

Next, and preferably, the instant invention will enter a loop over time that is indexed by the counter IT (step 325, and steps 335-365). In the example of FIG. 3, the loop the counter IT takes an initial value of zero and is incremented by 1 each pass, thereby suggesting that the preferred algorithm moves downward through the data in time step increments equal to the sample rate. Of course, other variations can readily be devised by those of ordinary skill in the art.

Additionally, it should be noted that although the preferred embodiment operates on the entire seismic trace (from a start time at the first sample to the last sample in the trace) it is well known to limit the calculations to a data window that encompasses less than the entire trace. If so, the counter IT might vary between $N_1 > 0$, and $N_2$ less than the number of samples in the trace.

As is indicated in decision item 330, if the end of the data or the bottom of the analysis window is reached, the instant invention will preferably terminate. Otherwise, the counter IT will be incremented (step 335), and the Fourier transform of the wave field at the current depth level will be calculated. As a next preferred step 345, the Fourier transform wave field will be multiplied by the error-compensating operator for each of the different constant velocities or medium parameters chosen.

As a next preferred step 350, the instant invention will calculate the inverse Fourier transform of the products of the previous step. Next, and according to step 355, the pseudo-differentiated wave field will be calculated at each point by forming a weighted sum of the referenced wave fields. Next, and preferably, the wave field at the next level (e.g., at the next sample interval or depth interval) will be calculated from the pseudo-differentiated wave field to which will be added twice the current wave field estimate and minus the wave field estimate at the previous level (i.e., at IT-1) plus a source term at the current level. The source term might be, for example, an impulse in time and space at the time and location of a controlled seismic source. It could also be a band-limited version of the same, or could be modeled after source signatures measured in the laboratory or field. It could also be a function determined from the measured seismic data recorded at a receiver or group of receivers, making use of reciprocity as is well known to those of ordinary skill in the art.

Finally, the wave field at the current time level will preferably be output to computer storage (e.g., magnetic disk, optical disk, nonvolatile RAM, etc.) for subsequent use in petroleum exploration or as input to other seismic processes, with the further processed traces being utilized by the explorationist.

Classically, the elastic wave equation has been required to properly express the variation of velocity of P and S waves in a medium with respect to propagation angle, an effect known as seismic anisotropy. But, often the seismic survey only has recordings of the P wave field, and it is desired to have a wave equation simpler than the full vector anisotropic elastic wave equation available for seismic modeling or processing.

Using the techniques discussed previously, it is possible to find the appropriate expression for $v_{phase}(\vec{k})$ (now no longer a constant, but a function of direction) and solve for the $F(\vec{k})$ that will give exactly that $V_{phase}$. Since $V_{phase}$ in an anisotropic medium has more free parameters than just v (since dt and dx, dy are generally fixed for a given simulation) the interpolation process is more expensive computationally. Under the assumption that $F(\vec{k})$ as a function of all free parameters still varies slowly and regularly as those parameters vary, it is possible to construct a cost-efficient high accuracy algorithm as discussed previously. For the VTI (vertical transverse isotropic) acoustic case, this is true for the parameters $V_v$, epsilon, and delta, as those terms are known and understood in connection with anisotropic subsurface wave propagation, i.e., $$delta = \frac{(Vnmo)^2 - (Vvert)^2}{(Vvert)^2/2}$$

$$epsilon = \frac{(Vhorz)^2 - (Vvert)^2}{(Vvert)^2/2},$$

where Vnmo is the NMO velocity, Vvert is the velocity measured in a vertical direction, and Vhorz is the velocity measured in a horizontal direction.

The above presentation sets out what is likely to be the most common case in practice. That is, the previous discussion teaches how an "exact" expression can be derived for use with P waves in a VTI medium. The text that follows is concerned with a simpler approximate model of VTI. The example that follows illustrates how to create a "designer" wave equation. This may not be exact physics, but it is convenient physics in that it's cheaper to compute and is almost exact. Further, an analysis of the approach that follows will makes it easier to understand the wave effects, particularly with respect to estimating the velocity parameters.

Turning now to another example of how the instant invention might operate in practice, consider the phase velocity in a VTI medium written in the spatial wavenumber domain:

$$v_{phase}^2(\vec{k}) = v_v^2 k_z^2 + \frac{(v_n^2 - v_h^2)k_x^2 k_z^2}{k_r^2} + v_h^2 k_x^2$$

A preferred expression of the pseudo-Laplacian would then take the form:

$$F(\vec{k}) = \frac{2\cos(v_{phase}(\vec{k})\Delta t|\vec{k}|) - 2}{v^2 \Delta t^2}$$

In this example, $v_{phase}$ is now explicitly a function of the wave propagation direction $\vec{k}$. Depending on the underlying assumptions, there could be many possible expressions for $v_{phase}$ and those of ordinary skill in the art will be readily able to devise them. That being said, as a general rule $v_{phase}$ should be chosen to at least roughly reflect the physics of the P-wave solution of an anisotropic wave equation.

In terms of a general approach, one preferred way to handle a VTI case is to build reference pseudo Laplacians (which are now anisotropic) for all 8 combinations of vmin and vmax, epsilon (min and max), and delta (min and max), apply the pseudo Laplacians in the Fourier domain and then inverse transform those "basis wavefields" back to the space domain. Finally, preferably using linear interpolation in $v^2$, epsilon, and delta, the appropriate action of the spatial operator can be recovered point by point on the spatial grid.

A second preferred approach would be to recognize that the Laplacian can be broken into components. For the VTI case, three components are needed: the analog of the second derivative in the vertical direction, the analog of the Laplacian in the x-y plane, and a cross term that has both the second derivative in the vertical direction and the derivative in the x-y plane. This operator would take the form $(kz^2*(kx^2+ky^2))/(kx^2+ky^2+kz^2)$. These three terms can be applied in the Fourier domain and then separately inverse transformed back to the space domain. Then each inverse transformed component will preferably be weighted by the spatially variable fields Vvert, Vnmo, and Vhorz. Of course to achieve pseudo-analytical accuracy, it would be preferred to not use $kz^2$ etc., but instead modified versions of each should be used as taught previously. Preferably, two reference versions of component will be used, e.g., each evaluated at the maximum and minimum velocity for that directional pseudo-derivative. The analog of $-kz^2$ may only need to be applied for the min and max of Vvert. The analog of the Laplacian in the x-y plane similarly will preferably only be created for the minimum and maximum of Vhorz. The cross term will preferably be evaluated only for the minimum and maximum of the difference of the squares of Vhorz and Vnmo. This approach results in only 6 inverse Fourier Transforms, rather than 8 as in the previous example.

For transversely isotropic ("TI") media with a spatially variable symmetry axis (thus, in general, non-vertical), the pseudo Laplacian for a transversely anisotropic medium with an arbitrary symmetry axis is not easily interpolated from pseudo Laplacians created for a few predetermined cases with fixed symmetry axes. For example the pseudo Laplacian for a transversely anisotropic medium with a symmetry axis along the y axis cannot be created easily from the pseudo Laplacians created for two tilted transversely anisotropic media, one along the z axis and one along the x axis. For the tilted TI case ("TTI"), the anisotropic pseudo Laplacian can be divided into its component parts along, and orthogonal to, the symmetry axis. Fortunately this is a relatively straightforward exercise in vector calculus and those of ordinary skill in the art will be readily able to perform this calculation. The resulting algorithm will operate as follows: the wavefield will be transformed into the spatial Fourier domain, and then multiplied by the Fourier domain expressions of the components of the anisotropic pseudo Laplacian in arbitrary coordinates. This product will then preferably be inverse transformed back to space coordinates, and multiplied by factors determined solely by the components by the direction cosines of the symmetry axis and its orthogonal symmetry plane and the appropriate anisotropic velocities at each point.

Note that the TTI case is very similar to the VTI case with the exception that vector calculus is used to create direction second-derivatives (or here, their analogous error correcting pseudo derivatives) in such a way that any arbitrary directional pseudo derivative can be created by linearly weighting the components that are calculated. Just as was the situation in the VTI case though, an algorithm will be produced that applies a suitably modified set of pseudo differential operators in the Fourier domain, inverse transforms those basis wavefields, and then combines them linearly to create the action of an arbitrarily spatially variable operator.

Preferred Applications

The instant invention has been described previously as an "engine" that can be used in a number of different applications. The text that follows discusses some of the preferred applications.

Migration.

Wave propagation is an essential component of reverse time and other migration algorithms. The instant invention can be used in place of standard wave propagation routines in any migration scheme that utilizes that approach.

Inversion.

As has been suggested previously, this same engine can also be used within a full 3D waveform inversion scheme to estimate subsurface rock parameters such as velocity. If the acoustic wave equation is used, which incorporates both velocity and density as medium parameters, inversion may produce a 3-dimensional volume giving both the velocity and density at each point. Note that seismic inversion is typically an iterative process wherein an initial parametric earth model is created and successively modified to maximize its fit with the actually seismic data. The hope, of course, is that the modifications will tend toward zero (i.e., the method converges). By way of example, it is commonplace in seismic inversion to create an initial velocity model, invert seismic data that image the subsurface have been acquired over the subsurface using the initial model, and then calculated an updated velocity model to use at the next iteration. As another example, a known velocity model might be used to estimate subsurface densities, porosities, anisotropy parameters, etc. via inversion. All that is required for purposes of the instant invention is that a velocity model be used within the inversion process to estimate some earth parameter which might be an updated velocity model or some other quantity.

Modeling/Simulation.

Another application for which the instant methods are ideally suited is modeling and simulation. Wave propagation through simple and complex subsurface models is a time-honored method of creating synthetic traces and sections and, of course, this is a core use for the instant invention. These synthetics are then used in a variety of ways in exploration. One use is to compare the synthetic with actual seismic data from the area which the subsurface model is believed to represent. When the synthetic data matches the actual seismic there is some confidence that the model is correct. Obviously, when the match is not perfect that suggests that the explorationist's belief about the subsurface (i.e., the model) is incorrect and should be changed. Another use for synthetics is in choosing the field parameters for seismic acquisition. It is obviously much cheaper to numerically simulate the expected results of a particular acquisition geometry than to acquire a survey and find out that the acquisition scheme was flawed. Thus, it is commonplace to test various acquisitions schemes using synthetics to choose the one that it is believed will result in the best quality data. There are many other uses for synthetic data of the sort that can be produced by the instant invention and those of ordinary skill in the art will be able to identify such uses.

CONCLUSIONS

By way of summary, the instant method seeks to cancel the errors that are inherent in standard numerical wave-propagation approaches by using a modified Laplacian that is utilized within a pseudo-spectral method.

Those of ordinary skill in the art will recognize that although the instant invention makes use of the Fourier transform it is not an absolute requirement that this transform be used. All that is required is that a basis be selected to represent waves on the computational grid of choice. For example, the Hankel transform can be used to propagate waves in cylindrical coordinates and the Legendre transform can be used to simulate waves in spherical coordinates. All that is required is a transform of computational convenience that allows derivatives to be taken in the transform domain. The previous disclosure teaches a general approach to modifying the classical derivatives in any coordinate system using the appropriate transform to create error-correcting pseudo-differential operators. Thus, when the terms "spectrum", "wavenumber domain", "Fourier transform", etc., are used herein, those terms should be broadly construed to include any discrete invertible, preferably orthonormal, transform that can be used to at least approximately reconstruct and/or differentiate the wavefield from which the "spectrum" was calculated In addition, transforms other than classical transforms such as Fourier, Hankel and Legendre could also be used. For example, in the case of some wave phenomena it might be preferable to use Wavelet transforms. All that is required is the ability to forward and inverse transform and differentiate (or pseudo-differentiate) via an operation in the transformed space.

Additionally, in some circumstances an analytical solution to the wave equation can be computed (e.g., in the constant coefficient case, or the case where the number of different velocity regimes is small, e.g., a few arbitrary shaped layers).

Further, the instant invention takes advantage of the fact that it is more useful to use pseudo-differential equations for certain classes of wave propagation problems than classical differential equations. One reason for this is because with the pseudo-differential equation approach there is more freedom to make things behave numerically in a particular way, something that cannot generally be done with regular partial differential equations. That is, this approach is more flexible, and allows the explorationist to design a computational model that captures exactly the parameters of interest that may be determined from the seismic information. Many things that are done in geophysics are an approximation of some sort or the other. By not extrapolating the waves in more detail than is required, the computation can be done for minimal cost. Contrast this with current art, for example, where anisotropic propagation requires the elastic wave equation, which carries along unnecessary and troublesome shear waves at great expense that not only do not contribute to the desired anisotropic P-wave solution, but actively harm it. In the context of time-domain wave propagation, this flexibility has not been realized heretofore. Accurate solutions of the wave equation are just one possible application of the methods discussed herein and those of ordinary skill in the art will readily be able to devise others.

Additionally, although the instant invention has been largely described in terms of a second-order time marching algorithm, that was done for purposes of illustration only and not with the intent of limiting the invention to second-order. Those of ordinary skill in the art understand that the teachings disclosed above provide a general method that could readily be applied to first order, third order, fourth order, etc., algorithms to obtain similar results.

Further, although the preferred embodiment of the instant invention utilizes a time-marching solution scheme, that is not an absolute requirement. The instant inventors have specifically contemplated that a similar scheme might be employed to create a space-marching solution. Thus, when the term "time marching" is used herein, that term should be understood to also include instances where the same techniques are applied to a space-marching algorithm.

The instant invention produces as an output seismic traces that are immediately useful in seismic exploration and are suitable for further processing according to methods well known to those of ordinary skill in the art. Note that when the terms "exploration" and "explore" are used herein, those terms should be broadly construed to include traditional seismic exploration as well as 4D (i.e., snapshots in time), 5D, etc., reservoir or other monitoring, and any other use to which seismic data might be applied.

In conclusion, the instant invention provides a general-purpose engine that is suitable for use with a number of different seismic processes. For example, it can be used to do the necessary forward and backward wavefield extrapolations inside of migration and especially reverse-time migration. Additionally, it might be used inside full-waveform inversion, to forward-propagate the wavefields to the receivers and back-propagate the residuals. It could also be used to generate synthetic models of the subsurface. A preferred use, though, is in connection with 3D pre-stack reverse-time imaging and full-waveform inversion and, in some cases, anisotropic modeling. In brief, the foregoing provides a general-purpose engine that could be used inside a variety of different algorithms to improve their performance and accuracy.

Additionally, note that, although the methods discussed herein have primarily been applied to the location of hydrocarbon deposits in the subsurface, those of ordinary skill in the art will recognize that the instant methods could readily be applied to the location of other subsurface resources (e.g., $CO_2$ deposits, minerals, etc.). As a consequence, when the term "subsurface resource" is used in the claims below, that term should be broadly interpreted to include hydrocarbon deposits as well as non-hydrocarbon deposits.

Still further, in the previous discussion, the language has been expressed in terms of operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, VSP data, full waveform sonic logs, controlled source or other electromagnetic data (CSEM, t-CSEM, etc.), or model-based digital simulations of any of the foregoing. Additionally, the methods claimed herein after can be applied to mathematically transformed versions of these same data traces including, for example: filtered data traces, migrated data traces, frequency domain Fourier transformed data traces, transformations by discrete orthonormal transforms, instantaneous phase data traces, instantaneous frequency data traces, quadrature traces, analytic traces, etc. In short, the process disclosed herein can potentially be applied to a wide variety of types of geophysical time series, but it is preferably applied to a collection of spatially related time series. Finally, can be used in any situation where numerical propagation of wave-like signals is desired. Note that when the term "seismic trace" herein that phrase should be broadly interpreted to include recorded geophysical signals other than seismic.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration within a predetermined volume of the earth containing structural and stratigraphic features conducive to the generation, migration, accumulation, or presence of subsurface resources, comprising the steps of:

a. accessing a digital representation of a seismic survey that images at least a portion of said predetermined volume of the earth;
b. selecting at least a portion of said seismic survey, thereby selecting a plurality of seismic traces;
c. obtaining a velocity model at least approximately representative of at least a portion of said imaged portion of said predetermined volume of the earth, said velocity model having at least one velocity therein;
d. using at least said a portion of said velocity model to determine an error compensating pseudo-differential operator;
e. using said error compensating pseudo-differential operator to construct a time-marching wave equation solution for use in a migration program;
f. migrating said plurality of seismic traces using said migration program, thereby producing a plurality of migrated seismic traces; and,
g. using at least a portion of said plurality of migrated seismic traces to explore for subsurface resources within the predetermined volume of the earth, and
wherein at least one of (c), (d), (e), or (f) is performed on one or more computers.

2. The method according to claim 1, wherein said velocity model consists of a single velocity.

3. The method according to claim 2, wherein said error compensating pseudo-differential operator $F(\vec{k})$ is defined by the equation:

$$F(\vec{k}) = \frac{2\cos(v\Delta t^2|\vec{k}|+1)-2}{v^2\Delta t^2},$$

where v is said single velocity, $\Delta t$ is a time step, $\vec{k}$ is a vector of Fourier transform coefficients (kx,ky,kz).

4. The method according to claim 1, wherein said time marching wave equation solution is a second order time marching wave equation solution.

5. The method of exploration for subsurface resources within a predetermined volume of the earth according to claim 1, wherein step (g) comprises the step of:
(g1) writing at least a portion of said plurality of migrated seismic traces to computer storage, and,
(g2) using at least a portion of said written portion of said plurality of migrated seismic traces to explore for subsurface resources within the predetermined volume of the earth.

6. The method according to claim 5, wherein said computer storage is selected from a group consisting of a magnetic disk, a magnetic tape, an optical disk, a magneto-optical disk, a DVD disk, RAM, a flash RAM drive, and non-volatile RAM.

7. The method according to claim 1, wherein step (g) comprises the step of:
(g1) viewing at least a portion of said plurality of migrated seismic traces on a display device, thereby using said at least a portion of said plurality of migrated seismic traces to explore for subsurface resources within the predetermined volume of the earth.

* * * * *